United States Patent [19]
Qureshi et al.

[11] Patent Number: 5,087,657
[45] Date of Patent: Feb. 11, 1992

[54] FIBER-REINFORCED COMPOSITES TOUGHENED WITH RESIN PARTICLES

[75] Inventors: Shahid P. Qureshi, Piscataway; Richard H. Newman-Evans; Hugh C. Gardner, both of Hillsborough, all of N.J.

[73] Assignee: Amoco Corporation, Chicago, Ill.

[21] Appl. No.: 314,165

[22] Filed: Feb. 23, 1989

[51] Int. Cl.$^5$ .................. C08K 3/04; C08K 71/12; C08K 73/00
[52] U.S. Cl. .................. 524/508; 524/495; 524/504; 525/68; 525/396; 525/905
[58] Field of Search .............. 524/495, 508, 504; 525/396, 905

[56] References Cited

U.S. PATENT DOCUMENTS

| | | | |
|---|---|---|---|
| 4,517,321 | 5/1985 | Gardner et al. | 523/400 |
| 4,579,885 | 4/1986 | Domeier et al. | 523/400 |
| 4,604,319 | 8/1986 | Evans et al. | 428/290 |
| 4,608,404 | 8/1986 | Gardner et al. | 525/396 |
| 4,656,208 | 4/1987 | Chu et al. | |
| 4,680,076 | 7/1987 | Bard . | |
| 4,686,250 | 8/1987 | Qureshi | 523/440 |
| 4,783,506 | 8/1988 | Gawin | 525/109 |

FOREIGN PATENT DOCUMENTS

| | | |
|---|---|---|
| 0133280 | 2/1985 | European Pat. Off. . |
| 0252725 | 1/1988 | European Pat. Off. . |
| 0274899 | 7/1988 | European Pat. Off. . |
| 49132669 | 5/1976 | Japan . |
| 1306231 | 2/1973 | United Kingdom . |

OTHER PUBLICATIONS

"Development of Resins for Damage Tolerant Composites, a Systematic Approach", Diamant and Moulton; 29th National SAMPE Symposium, Apr. 3-5, 1984, published in SAMPE Quarterly, Oct. 1984, pp. 13-21.

*Primary Examiner*—Jacob Ziegler
*Attorney, Agent, or Firm*—Richard J. Schlott; William H. Magidson; Ralph C. Medhurst

[57] ABSTRACT

Layered, fiber-reinforced composites are toughened by the use of thermosetting matrix resins including polyphenylene ether particles. The method of the invention is particularly effective in improving the toughness of composites based on thermoset matrix resins.

12 Claims, No Drawings

FIBER-REINFORCED COMPOSITES TOUGHENED WITH RESIN PARTICLES

BACKGROUND OF THE INVENTION

This invention relates to composite materials and more particularly to tough, impact resistant fiber-reinforced composites. Still more particularly, this invention relates to methods for toughening fiber-reinforced composites and to particles useful in toughening such composites.

Fiber-reinforced composites are high strength, high modulus materials which are finding wide acceptance for use in sporting goods and in producing consumer items such as appliances. Such materials are also finding increased acceptability for use as structural components in automotive applications, as components of buildings and in aircraft. Typically, the composites used in structural applications comprise structural fibers in the form of continuous filaments or woven cloth embedded in a thermosetting or thermoplastic matrix. Such composites may exhibit considerable strength and stiffness, and the potential for obtaining significant weight savings makes them highly attractive for use as a metal replacement. However, acceptance for many structural applications has been limited by the fact that many of the composite materials presently available are brittle. The inability of such composites to withstand impact while retaining useful tensile and compression strengths has been a serious problem for many years. Compensating for the low impact resistance of such materials may ordinarily be accomplished by increasing the amount of material employed. This approach increases costs, reduces the weight savings that might otherwise be realized and may make them unacceptable for many uses.

The composites industry has long been involved in finding ways to overcome these deficiencies. Considerable effort has been expended over the past two decades directed toward the development of composites with improved fracture toughness. Inasmuch as most of the commonly employed matrix resins, as well as many of the reinforcing fibers, are generally brittle, much of that effort has gone into a search for components having better toughness characteristics. As a consequence, the search for toughened matrix resins has become the subject of numerous recent patents and publications.

For decades, the plastics industry has used rubber modifiers to toughen rigid, frequently brittle thermoplastic and thermoset engineering resins. Most often the rubber is dispersed in the form of particles throughout the rigid resin. Various means for altering the interaction between the rubber particle and the rigid phase to improve the effectiveness of the rubber component have also been explored. For example, the rubber components have been modified by grafting to change compatibility with the rigid phase, and adding reactive functional groups to the rubber to promote bonding to the rigid phase has also been shown to be effective. Other approaches have included the combining of dissimilar resins, forming blends and alloys with improved properties.

The methods used for toughening engineering resins have been adapted for the toughening of the matrix resins commonly used in composite structures, as shown for example by Diamant and Moulton in "Development of Resin for Damage Tolerant Composites—A Systematic Approach", 29th National SAMPE Symposium, Apr. 3–5, 1984. The forming of alloys and blends by adding a more ductile thermoplastic such as a polysulfone to an epoxy resin formulation has also been shown to improve the ductility of the epoxy resin and provide enhanced toughness, according to British patent 1,306,231, published Feb. 7, 1973. More recently, combinations of an epoxy resin with terminally functional thermoplastics were shown to exhibit enhanced toughness. See U.S. Pat. No. 4,498,948. Still more recently, curable combinations of epoxy resins and thermoplastics with reactive terminal functionality were also said to improve the toughness of specifically formulated matrix resins, provided that the neat resin after curing exhibits a specific phase-separated morphology having a cross-linked glassy phase dispersed within a glassy continuous phase. See U.S. Pat. No. 4,656,208. Further improvements are said to be achieved by including a reactive rubber component which is said to be contained within the cross-linked dispersed glassy phase. See U.S. Pat. No. 4,680,076. Still more recently, the use of an infusible particle made from a rubber dispersed within the phase-separated cross-linked epoxy resin matrix has been suggested for toughening composites based on such matrix resins. See U.S. Pat. No. 4,783,506.

Although the addition of rubber, thermoplastics and the like generally improves the ductility and impact resistance of neat resins, the effect on the resulting composites is not necessarily beneficial. In many instances the increase in composite toughness may be only marginal, and a reduction in high temperature properties and in resistance to environmental extremes such as exposure to water at elevated temperatures frequently is seen. Composite structures that rely on complex manufacturing methods or on unique resin morphologies that are difficult to reproduce for achieving improvements in toughness may require an impractical degree of control during fabrication, adding to the production costs and often resulting in erratic performance and poor reliability.

An alternative approach to producing toughened composites has been the development of layered composite structures having layers formed of fibers imbedded in a matrix resin alternated with layers formed of a thermoplastic resin, described in Japanese patent application 49-132669, published May 21, 1976. More recently, in U.S. Pat. No. 4,604,319, there were disclosed layered fiber-resin composites having a plurality of fiber-reinforced matrix resin layers inter-leafed with thermoplastic layers adhesively bonded to the reinforced matrix resin layers. Inter-leaf structures are ordinarily produced by impregnating continuous fiber to form prepreg, then laying up the composite by alternating prepreg with sheets of thermoplastic film. The laid-up structure is then subjected to heat and pressure, curing the matrix resin and bonding the layers. The patent also discloses inter-leaf layers which comprise a thermoplastic filled with a reinforcing material such as chopped fibers, solid particles, whiskers and the like.

Although inter-leafed composite structures with improved toughness have been disclosed, there has been some sacrifice in other physical properties, including a reduction in glass transition temperatures together with an increase in creep at high temperatures. Further difficulties with such composites may include a loss in stiffness for many such compositions, adhesive failure that may occur between layers formed of dissimilar resins and property deterioration during use due to poor solvent resistance. In addition, prepregs based on thermoplastic resin generally are lacking in tack, which complicates their fabrication into composites and increases the degree of skill needed to fabricate complex structures. This may in turn result in increased scrap losses and a need for more complex quality control procedures, increasing manufacturing costs in order to achieve an acceptable level of reliability.

The compositions and methods presently available for producing toughened composites thus require further improvement. Composites having improved resistance to impact and particularly those with better compressive strength after impact would be a useful advance in the art, and reliable methods for producing such toughened composites could find rapid acceptance, displacing the more complex and expensive manufacturing processes currently available for these purposes.

SUMMARY OF THE INVENTION

The present invention is directed to layered composite structures comprising continuous fiber and a matrix resin formulation toughened by including particles formed of a finely divided polyphenylene ether resin. More particularly, the invention is directed to matrix resin formulations filled with polyphenylene ether resin particles for use in producing toughened composite structures, and to a method for toughening layered composites formed of a plurality of spaced-apart, discrete layers or plies comprising continuous fiber imbedded in a matrix resin by adding the resin particles to the matrix resin within the inter-ply spacing of the layered composite before curing. The resulting composite structures exhibit a marked and unexpected improvement in toughness.

DETAILED DESCRIPTION

The toughened composite structures of this invention comprise discrete layers formed of continuous fiber embedded in a matrix resin, the layers being separated or spaced normally apart by laminar regions or layers comprising matrix resin filled with polyphenylene ether particles.

The Matrix Resins

The matrix resins useful in forming toughened composites according to the practice of this invention are the resin formulations commonly used in the fiber-reinforced composites art and may include both thermosetting and thermoplastic materials. However, thermosetting resins will be preferred for most applications and the thermoset resins useful in this application will include those most commonly employed for making fiber reinforced composites such as epoxy resins, cyanate resins, bismaleimide resins, BT resins comprising a combination of cyanate and bismaleimide resin components, mixtures of such resins and the like, as well as the widely used cross-linkable polyester resins. Many thermoset resins generally possess low ductility and consequently are quite brittle. Composite structures based on such resins are therefore greatly benefited when toughened according to the teachings of this invention.

The preferred matrix resin formulation will thus be based on a thermoset resin. Particularly preferred are the well known and widely used epoxy formulations comprising in general an epoxy resin and an appropriate curing agent such as a diamine hardener or the like. The epoxy formulations may optionally include an appropriate curing accelerator and such additional components as are commonly employed in the thermoset composite art.

The epoxy resins which may be employed are curable epoxy resins having a plurality of epoxy groups per molecule. Such resins are commonly employed for producing composite materials, and many are readily available from commercial sources. Examples of such resins are polyglycidyl compounds, including the reaction products of polyfunctional compounds such as alcohols, phenols, carboxylic acids, aromatic amines or aminophenols with epichlorohydrin, and epoxidized dienes or polyenes. Further examples include cycloaliphatic epoxides, such as the reaction products of polyfunctional cycloaliphatic carboxylic acids with epichlorohydrin, cycloaliphatic epoxides, cycloaliphatic epoxy ethers and cycloaliphatic epoxy esters. Mixtures of epoxy resins may also be used. Preferred epoxides include Bisphenol A epoxides, epoxy novolacs, cycloaliphatic epoxy ethers and glycidyl amines. A wide variety of these epoxy resins are available from commercial sources under trade names such as PGA-X from Sherwin Williams Company, DEN 431 and XU71756 from Dow Chemical Company, Glyamine 125 from F.I.C. Corp. and RD87-160 and MY-720 from Ciba-Geigy Corp.

Diamine hardeners which may be used include the aromatic diamines conventionally employed in formulating epoxy resins, such as for example, 4,4'-diaminodiphenyl ether, 4,4'-diaminodiphenyl methane, 4,4'-diaminodiphenyl sulfone, 3,3'-diaminodiphenyl sulfone, p-phenylene diamine, m-phenylene diamine, 4,4'-bis(aminodiphenyl) propane, 4,4'-diaminodiphenyl sulfide, trimethylene glycol bis(p-aminobenzoate) and the like, as well as their various position isomers. Also useful are the variety of polynuclear aromatic diamine hardeners such as those disclosed for example in U.S. Pat. Nos. 4,579,885 and 4,517,321, and U.S. Pat. No. 4,686,250, all incorporated herein by reference, as well as xylylene diamine, bis(aminomethyl) cyclohexane, dicyandiamide and the like. The various diamine hardeners may be used alone or in combination.

Suitable epoxy resin formulations may be prepared according to methods and practices well known and widely used in the resin art. Generally the matrix resin formulations will comprise greater than 2 parts by weight (pbw) diamine hardener per hundred parts by weight epoxy resin. Although the particular level selected will depend upon the particular diamine employed, preferably at least 3 pbw and more preferably from about 6 to about 150 pbw diamine hardener per hundred pbw epoxy resin will be used. The amount of each component selected will depend upon the molecular weights of the individual components and the molar ratio of reactive amine (N-H) groups to epoxy groups desired in the final matrix resin system. For most prepreg and composite applications, sufficient diamine hardener will be used to provide a molar ratio of N-H groups to epoxide groups in the range of from about 0.3/1 to 1.8/1, preferably from 0.4/1 to 1.3/1.

The formulations may further include a thermoplastic polymer dissolved therein prior to curing. Such materials may contribute to the, toughness of the resulting composite by increasing the ductility and impact resistance of the cured resin formulation. Thermoplastics may also increase the viscosity and film strength of the uncured resin, thus improving the resin processability during impregnating operations and the handling of the prepreg during composite manufacture. Although a variety of thermoplastics are known in the art for use in combination with epoxy resins, including for example polyaryl ethers such as polyaryl sulfones, polyether ketones, polyphenylene ethers and the like, as well as polyarylates, polyamides, polyamide-imides, polyether-imides, polycarbonates, phenoxy resins and the like, in order to be effective for improving the viscosity, processability and handling characteristics the thermoplastic selected will be soluble in the uncured epoxy resin formulation. The proportion of thermoplastic employed will depend in part upon the thermoplastic selected and the particular end use envisioned. However, for most purposes, the formulation will comprise from 0 to 30 pbw of thermoplastic per 100 pbw of the combined diamine hardener and epoxy resin components.

The epoxy formulations may additionally include an accelerator to increase the rate of cure. Any of the accelerators known and used in the epoxy resin art may be employed in conventional amounts, including Lewis acid:amine complexes such as $BF_3$:monoethylamine, $BF_3$:triethanolamine, $BF_3$:piperidine and $BF_3$:2-methylimidazole; amines such as imidazole, 1-methyl imidazole, 2-methyl imidazole, N,N-dimethylbenzylamine and the like; acid salts of tertiary amines such as the p-toluene sulfonic acid:imidazole complex and the like, salts of trifluoromethane sulfonic acid such as FC-520 (obtained from 3-M Company), organophosphonium halides, dicyandiamide, 4,4'-methylene bis(-phenyl-dimethyl urea) and 1,1-dimethyl-3-phenyl urea. Mixtures of such accelerators may also be employed. For some end uses it may also be desirable to include dyes, pigments, stabilizers, thixotropic agents and the like, and these and other additives may be included as needed at levels commonly practiced in the composite art. Upon curing, the matrix resin formulations, exclusive of any such particulate additives which may be employed, will form a substantially single, continuous rigid phase.

The Fibers

The matrix resin formulation will be combined with continuous fiber reinforcement or structural fibers and a particulate modifier in forming toughened composites according to the practice of this invention. Suitable fibers may be characterized in general terms as having a tensile strength of greater than 100 kpsi and a tensile modulus of greater than two million psi. Fibers useful for these purposes include carbon or graphite fibers, glass fibers and fibers formed of silicon carbide, alumina, titania, boron and the like, as well as fibers formed from organic polymers such as for example polyolefins, poly(benzothiazole), poly(benzimidazole), polyarylates, poly(benzoxazole), aromatic polyamides, polyaryl ethers and the like, and may include mixtures comprising two or more such fibers. Preferably the fibers will be selected from glass fibers, carbon fibers and aromatic polyamide fibers such as the fibers sold by the DuPont Company under the trade name Kevlar. The fibers may be used in the form of continuous tows of typically from 500 to 420,00 filaments, as continuous unidirectional tape or as woven cloth.

The Particulate Modifiers

The particles employed in the practice of this invention comprise a finely divided polyphenylene ether resin. The resin particles may be solid or hollow and take any convenient shape, and may for example be formed into bead-like spheres or oblate spheroids, or produced by pulverizing or grinding a rigid resin to provide particles rough and irregular in shape. Cylinders and prisms, both regular and irregular in cross section, preferably with an aspect ratio greater than 2:1, such as may be encountered in short fibers, flock, fiber pulp, fibrils and the like, and flake-like particles, again with an aspect ratio greater than 2:1, represented by fragments of film, by mechanically flattened particles and the like may also be used in the practice of this invention.

The rigid particles will be formed from a polyphenylene ether resin. More particularly, the resins which may be useful either directly or as precursors in forming suitable particles include the polyphenylene ether resins, some of which may also be designated in the trade as polyphenylene oxides. Typical of such resins are the phenylene ether polymers of 2,6-dialkylphenols and the copolymers thereof, which are well known and readily available from commercial sources. Particularly useful are the polymers and copolymers of 2,6-dimethylphenol, presently available in the trade as PPO resins and PPE resins.

The polyphenylene ether resins are characterized as rigid, meaning that the resin selected will have, in its final particle form, sufficient thermal resistance, hardness and rigidity to resist being melted, compressed or flattened under the pressures and temperatures that will be encountered during the fabricating and curing of the laminate.

Where the particles will be dispersed in the matrix resin formulation and then applied to the fiber reinforcement or prepreg, the particles will necessarily be formed of a polyphenylene ether resin selected to be substantially insoluble in the matrix resin formulation prior to gelation. Polyphenylene ether resins that are soluble in the selected matrix resin at elevated temperatures may also be useful for these purposes provided that they are substantially insoluble in the uncured resin at ambient or moderately elevated temperatures and precipitate from such solutions upon cooling to form discrete, well-dispersed particles.

The polyphenylene ether resins may be employed alone or in combination with other resins such as polystyrene, polyamides and the like in forming the particles. However, in order to be useful, such mixtures will necessarily exhibit the required physical characteristics including adequate rigidity and substantial insolubility in the matrix resin as set forth above. Soft or rubbery resin alloys or blends having glass transition temperatures below about 15° C. or hardness values below about D-50 (Shore), and those having a melt temperature substantially below the expected processing temperature may melt or significantly soften during composite fabrication and thus will not be suited for use as particles in the practice of this invention.

Many suitable rigid polyphenylene ether resins are readily available commercially in the form of powder, or may be obtained in solid form and then processed by ordinary means such as milling or grinding to provide a suitable particle. In the alternative, a variety of precipitation methods may be employed, including for example a solvent precipitation process whereby the resin is first dissolved in a suitable solvent, then coagulated with vigorous stirring to provide a dispersion or slurry of particles which may then be collected and dried. The resins may also be used in the form of fiber flock, or formed into a film by well-known methods and chopped to provide flake. Resins having adequate ductility may be molded and flaked in commercial equipment, or formed into particles and then subjected to pressure using mill rolls or the like, usually with heating, to form flake-like particles.

Good adhesion between the resin particle and the matrix resin may enhance the effectiveness of the particle in toughening composites. Many of the particle precursor materials will exhibit good adhesion to thermoset matrix resins as an inherent characteristic of the resin. It may also be desirable to modify the polyphenylene ether resin particles to include functional groups capable of reacting with the matrix resin and thereby becoming chemically bound, and methods for incorporating compounds with reactive functionality into polyphenylene ether resins are known in the art. Alternatively, surface modification of the particle or its precursor may improve adhesion by chemically binding the matrix resin to the particle surfaces or by improving the affinity of the particle for the matrix resin due to the presence of polar groups at the particle surface.

The Composite Structures

The toughened composite structures of this invention comprise discrete layers formed of continuous fiber embedded in a matrix resin, the layers or plies being separated or spaced normally apart, the layer surfaces defining laminar regions or spacing layers comprising matrix resin filled with the polyphenylene ether resin particles. The particles serve to separate the plies, and the thickness of the ply spacing will thus be directly related to the particle size. Where the particles take the shape of film fragments or flakes, the particles may be either dispersed as a monolayer on the surfaces of the plies or stacked in brick-like fashion, depending upon the method of fabrication selected; the ply spacing that results will then be a multiple of the thickness of the flake. While cylindrical particles such as chopped fiber, flock or fibrils may become entangled and felted, giving a spacing substantially greater than the cross sectional dimension of the particles, the preferred cylindrical particles will be of a character and size such that entanglement and felting do not occur.

The filled resin spacing layers separating the plies will have an average thickness lying in the range of from about 1 micron to about 75 microns. It appears that the effectiveness of such filled matrix resin layers in toughening the composite may be greatest for layers substantially uniform in thickness, which could best be accomplished by using particles which are substantially uniform in size. As used herein, the term "particle size" refers to the particle dimension determining the ply separation, which for small, irregular or substantially spherical particles is ordinarily the particle thickness or smallest diameter. For fiber-like particles, particle size will be taken to refer to the diameter of the fiber, while for flake-like particles the term refers to the thickness of the flake. Inasmuch as it will not be practical in most instances to obtain particles uniform in size throughout, the particulate modifiers will ordinarily comprise mixtures of particles encompassing a variety of particle sizes, with the majority of the particles lying in the range of from 1 to about 75 microns, and these mixtures will be useful and effective in toughening composites. Mixtures of powdered particulate materials suitable for the purposes of this invention may be obtained by classifying particle mixtures using well-known methods such as screen classification and the like.

Use of particulate mixtures comprising a wide variety of particle sizes may have other detrimental effects and therefore be less preferred. Dispersing mixtures of particles in the matrix resin formulation uniformly may be made more difficult by the presence of very large particles, and the coating characteristics of the filled resins will be more variable. The presence of a small number of very large (>50 micron) particles widely dispersed in the film of uncured filled matrix resin adhered to one or both surfaces of a prepreg tends to create significant peaks or high spots at the outer surface. The presence of such high spots has the effect of an apparent surface roughness, reducing the surface tack of the prepreg by preventing full and effective contact between layers in a layup operation. The reduced tack will be particularly noticeable for particle mixtures that comprise a wide distribution of particle sizes, hence, narrowly disperse particle mixtures will be preferred.

The proportion of each component employed in fabricating the toughened composites of this invention will depend in part upon the end use envisioned, as well as on the particular resin, fiber and resin particles selected. Overall, the composites will comprise from about 20 to about 80 wt % continuous fiber, the balance comprising matrix resin and particles, with the particles amounting to from 1 to about 25 wt % based on combined weight of the particles and the matrix resin formulation. Although the level of resin particles needed to toughen the composite will lie within the stated range, the optimum level will necessarily vary depending upon the type of matrix resin, the fiber loading, the particle type and similar factors, and must therefore be determined for the particular fiber and resin system employed. In general, it will be desirable to employ the lowest level of particles that will impart the desired improvement in composite toughness. Although greater than optimum levels may be employed, further improvements in toughness will be marginal, and other physical properties such as hot/wet strength may be detrimentally affected. The method of this invention for toughening composites provides composites having a very high fraction of the particles located in the interply spacing, and thus lends itself well to providing improvements in toughness at a minimum level of particles.

Composite Fabrication

Methods ordinarily used for the production of layered composites may be readily adapted for fabricating the composites of this invention. Most commonly, such composites are formed from impregnated tape comprising uniformly disposed, parallel filaments of continuous fiber, or from resin-impregnated fabric woven from continuous fiber tow. These impregnated fiber structures, designated prepreg, may be produced by impregnating tape or fabric with matrix resin formulation in an uncured state using any convenient method including melt coating, calendaring, dip impregnation with a resin solution or molten resin, melt pressing the tape or fabric into a film of the matrix resin or the like.

The composite will then be formed by laying up sheets or tapes of the prepreg to form a layered stack or lay-up, and curing the lay-up, usually with heat and under pressure. The prepreg layers, each comprising continuous fiber and matrix resin in uncured form, will have their adjoining surfaces adhered upon curing to form a single structure having discrete layers of continuous fiber embedded in an essentially continuous and substantially homogeneous matrix resin phase.

In forming the toughened composites of this invention, it will be necessary to distribute the polyphenylene ether resin particles uniformly between each of the prepreg layers. A variety of methods may be used for this purpose, and the placing of particles at a surface of the prepreg may be carried out as a separate step prior to or during the lay-up operation, or integrated into the step of impregnating the tape or woven fabric. The former will be referred to as two-step processes, while the latter are termed one-step processes.

Methods for carrying out the two-step process include physically distributing the particles by a sprinkling, spraying, spreading or similar operation on a surface of each prepreg tape or sheet during the lay-up operation; dispersing the particles uniformly in liquid matrix resin formulation and coating the mixture on a surface of the prepreg; forming a film of particle-filled matrix resin formulation and inter-leafing the prepreg layers with the film during the lay-up operation and the like. Two-step methods based on a coating or inter-leafing step provide added matrix resin, ensuring that adequate matrix resin is available to fill the laminar region between the plies formed by the particles.

In the alternative one-step method, the particles may be placed on a surface of the prepreg during the impregnation step by dispersing the particles into the matrix resin and then carrying out the impregnation step. In this process, a fiber structure having a surface layer of the filled resin may be formed, for example, by placing a film of filled resin on a surface of tape or fabric or by coating the filled resin directly onto the surface. The continuous fiber is then embedded in the matrix resin by heating the fiber-and-resin structure in a melt-pressing or ironing operation. The matrix resin becomes molten and a portion flows into the fiber structure, leaving behind at the tape or fabric surface matrix resin filled with those particles too large to enter the interstices of the fiber structure. The one-step process may be viewed as a filtering operation whereby the fiber structure acts as a filter, passing matrix resin while retaining at the surface those particles larger than the openings between the fibers.

As previously noted, other than the adaptations needed to introduce the particles, the lay-up and curing steps used in preparing the toughened composite structures will be conventional. These process steps may be carried out using any of the variety of conventional processing devices and equipment and employ such conventional process steps, adaptations and modifications as are ordinarily employed in the composite art.

The invention will be better understood by consideration of the following Examples, which are provided by way of illustration. In the Examples, all parts are by weight, and all temperatures are given in Centigrade unless otherwise noted.

EXAMPLES

The following materials and formulations are employed in the Examples.

| Epoxy Resin Formulations | |
|---|---|
| component | pbw |
| EP-1 | |
| bis (2,3-epoxycyclopentyl) ether, epoxy resin | 41.8 |
| 4,4'-bis(3-aminophenoxy) diphenyl sulfone, amine hardener | 49.4 |
| BF3:TEA boron trifluoride:triethanolamine complex; curing aid/accelerator | 0.9 |
| PEI Polyether imide obtained as Ultem 1000 from General Electric Company | 7.9 |
| total | 100.0 |
| EP-2 | |
| N,N,N'N'-tetraglycidyl-4,4'-methylene dianiline, MY 9612 epoxy resin from Ciba Geigy | 28.0 |
| O,N,N-triglycidyl p-aminophenol, MY 0510 epoxy resin from Ciba Geigy | 37.0 |
| 3,3'-diaminodiphenyl sulfone, HT 9719 amine hardener from Ciba Geigy | 18.6 |
| N,N-dimethyl-N'-phenyl urea, Omicure 94 cure accel. from Omicron Chemicals | 0.4 |
| PES Polyether sulfone, Victrex 200P from ICI Company | 16.0 |
| total | 100.0 |
| BMI-1 | |
| Eutectic blend of methylene diamine BMI, toluene diamine BMI and trimethylhexane BMI, Compimide 353 from Technochemie | 64 |
| o,o'-diallyl bisphenol A, Martrimide 5292 B from Ciba Geigy | 34 |
| triallyl isocyanurate | 1.6 |
| dicumyl peroxide | 0.4 |
| total | 100.0 |

Particles

Resin particles were prepared from poly (2,6-dimethyl phenol), obtained as PPO resin from the general Electric Company. The resin was received in powder form and was classified by screening to provide the following materials. In some instances, the resin particle size was further reduced by milling, impact milling or grinding before screening.

PPO-1, median size 29 microns, 100% less than 64 microns.

PPO-2, median size 24 microns, 100% less than 96 microns. PPO-3, median size 25 microns, 100% less than 50 microns.

PPO-4, median size 11 microns, 100% less than 25 microns.

Fibers

Carbon fiber

Thornel ® T650-42 grade carbon fiber from Amoco Performance Products, Inc. This fiber typically has a filament count of 12,000 filaments per tow, a yield of 0.44 g/m, a tensile strength of 730 kpsi, a tensile modulus of 42 mpsi and a density of 1.78 g/cc.

In the Examples, ribbon formed from the fiber was used to prepare prepreg having fiber areal weights of 144 to 161 g/m².

Test Procedures

Compression After Impact Test (CAI). This procedure, referred to as the Compression After Impact test or CAI, is generally regarded as a standard test method in the industry. The test specimens are panels measuring 6×4 in., cut from 32 ply fiber-reinforced composite sheets. The panels are first impacted by being subjected to an impact of 1,500 in-lbs/in at the center in a Gardner Impact Tester, using a ⅝ in. diameter indenter; a panel thickness of 0.177 in. was assumed. The impacted panel is then placed in a jig and tested edgewise for residual compressive strength. The details are further described in "NASA Contractor Report 59293", NASA, August, 1980.

Open-hole Compressive Strength (OHC). This procedure is conducted on 1×3 in. coupons cut from the CAI test panels. The test coupons had a ¼ in. hole drilled in the center. The specimen was placed in an Instron Tester, using a fixture with a ½ in. unsupported area around the hole. The specimen was then end-loaded to failure, and the load-to-failure recorded. Dry specimens were tested as received, while the moisture conditioned specimens were immersed in boiling water for three days before testing.

The methods of the following Examples are representative of those that may be employed for preparing the resin formulations, prepreg and composites useful in the practice of this invention. The processes will be generally recognized by those skilled in the art as processes and methods commonly employed for the production of thermoset resin formulations and composites.

Control Example A

An EP-1 resin formulation was prepared by heating 41.8 parts by weight (pbw) of bis (2,3-epoxycyclopentyl) ether to 130° while stirring, and then adding 7.9 pbw of Ultem 1000 polyether imide resin. Stirring and heating was continued at 130° while the resin dissolved, about one hour, and then 49.4 pbw of 4,4'-bis (3-aminophenoxy) diphenyl sulfone were added, cooling the mixture to 90°. The mixture was stirred and heated at 105° for about 10 minutes, then cooled to 80° and 0.9 pbw of BF3-triethanolamine complex was added with vigorous stirring. After an additional 10 min. of stirring, the resin was discharged from the reaction vessel and cooled.

The thermosetting epoxy formulation was coated on 13.5 in. width silicone-coated release paper, obtained as W-89-SPT-6BE/PST3A from Mead Release Products Company. The coating was made at a coating weight of 35 g/m², to provide two rolls of coated paper. A 12 in. wide ribbon of carbon fiber was formed from 105 tows of carbon fiber. A prepreg machine was used to form the prepreg by sandwiching the ribbon between films from the two rolls and pressing to provide a tape having 69.5 wt. % carbon fiber, a fiber areal weight of 160 g/m², and a thickness of about 5.5 mils.

The prepreg tape was laid up into 15×15 inch laminates with a ply configuration of [+45/90/−45/0]$_{4S}$ and cured in an autoclave under 90 psi pressure at 355° F. for 2 hr. The resulting composite panel, after cooling, was used to provide test specimens for the CAI and OHC evaluations.

Control Example B

An EP-2 epoxy resin formulation was prepared by heating a solution of 675 pbw of the triglycidyl p-amino phenol and 950 pbw of the tetraglycidyl methylene dianiline in 2,000 pbw of methylene chloride to 45°. The mixture was stirred and methylene chloride was distilled while adding 400 pbw polyether sulfone. The stirred mixture was further heated to remove methylene chloride, finally to a reduced pressure of 28 in. and a temperature of 110° and held at that temperature for 1 hr. The diaminodiphenyl sulfone, 465 pbw, was then added over a 5 min. period and the mixture was then stirred at 100° for 1 hr., under a vacuum of 28 in. to remove residual solvent. After the temperature was reduced to 90°, 10 pbw of the Omicure 94 was added, stirring was continued for 5 min. and the resin was discharged.

The resin was used to prepare prepreg and composite substantially by the procedures of Control Example A. The prepreg tape had a fiber areal weight of 145 g/m².

Control Example C

A 2 l flask, equipped with a paddle stirrer, inlet and outlet for inert gas and a thermometer, was charged with 340 g of o,o'-diallyl bisphenol A. The contents of the flask were heated with stirring to 120° C. and held at that temperature while 640 g of Compimide 353 BMI resin were added over a 30 min. period. The temperature of the mixture was lowered to 110° C. and held for 45 min. at that temperature. The mixture was then cooled to 80° C. before adding a solution of 4 g of dicumyl peroxide in 16 g of triallyl isocyanurate. The mixture then was stirred for an additional 5 min. before discharging.

The resin was used to prepare prepreg and composite substantially by the procedures of Control Example A.

EXAMPLE 1

A filled EP-1 resin formulation was prepared by heating 41.8 parts by weight (pbw) of bis (2,3-epoxycyclopentyl) ether to 130° while stirring, and then adding 7.9 pbw of Ultem 1000 polyether imide resin. Stirring and heating was continued at 130° while the resin dissolved, about one hour, and then 49.4 pbw of 4,4'-bis (3-aminophenoxy) diphenyl sulfone were added, cooling the mixture to 90°. The mixture was stirred and heated at 105° until the diamine dissolved, about 10 minutes, and then 7.5 pbw of PPO-1 particles were added with vigorous stirring before cooling the mixture to 80° and adding 0.9 pbw of BF3-triethanolamine complex, again with vigorous stirring for an additional 10 min. The resin was then discharged from the reaction vessel and cooled.

Films of the filled resin were formed by coating at a coating weight of about 33 g/m² and the procedures of Control Example A were substantially followed to provide a prepreg tape having a fiber areal weight of 160 g/m² and a resin content of 28.8 wt %. Composite panels were formed substantially by the processes of Control Example A.

EXAMPLE 2

A filled EP-2 resin formulation was prepared by first heating a pre-blend of the epoxy resin components and the PES to 120° C., then adding 279 pbw of the diamine. The mixture was cooled to 110° C. and stirred while 113 pbw of PPO-3 particles were added, and then further cooled to 105° C. before adding the urea cure accelerator and discharging the resin into trays.

Films of the filled resin were formed by coating at a coating weight of about 42 g/m² and the procedures of Control Example A were substantially followed to provide a prepreg tape having a fiber areal weight of 160 g/m² and a resin content of 36.5 wt %. Composite panels were formed substantially by the processes of Control Example A.

EXAMPLE 3

The procedures of Control Example C were followed substantially to prepare a BMI-1 resin formulation, but replacing the solution of dicumyl peroxide in triallyl isocyanurate with 3 g of dicumyl peroxide dissolved in 17 g of 1-allyl-4-allyloxy-3-methoxybenzene. Prior to discharging the resin, 70 g of PPO-1 resin particles were added. After mixing for about 10 min. to uniformly disperse the particles, the resin was discharged. Composites were prepared substantially following the procedures of Example 1. The composite composition and properties are summarized in Table I.

EXAMPLE 4

A frozen sample of EP-1 resin, 88 pbw, was charged to a sigma blade mixer and allowed to warm to room temperature. PPO-2 powder, 12 pbw, were added and the mixture was sheared for about 25 min. to disperse the particles uniformly, giving a resin temperature of about 45°. A film of the filled resin was prepared at a coating weight of 32 g/m$^2$, and combined using a prepreg machine with prepreg tape having a fiber content of 76 wt % and a fiber areal wt. of 145 g/m$^2$, prepared from carbon fiber and EP-1 resin following the procedures of Control Example A. The final prepreg tape had a fiber content of 64.9 wt % and a fiber areal weight of 145 g/m$^2$, with PPO-2 particles dispersed in the resin coating on one surface. Composites were prepared substantially by the procedures of Example 1 to provide test panels having a panel thickness of 0.178 in. The composite composition and property data are summarized in Table I.

EXAMPLE 5

An EP-2 epoxy preblend was prepared by heating a mixture of 675 pbw of the triglycidyl p-aminophenol and 950 pbw of the tetraglycidyl methylene dianiline in 2,000 pbw of methylene chloride to 45°. The mixture was stirred and methylene chloride was distilled while adding 400 pbw of polyether sulfone. The stirred mixture was further heated to remove methylene chloride, finally to a final temperature of 110° at a reduced pressure of 40 mm Hg, and held at that temperature for 1 hr. The diaminodiphenyl sulfone, 465 pbw, was then added over a 5 min. period, the mixture was heated at 110° C. for 15 min. and 407 pbw of PPO-4 particles were then added with stirring. After stirring an additional 15 min. to disperse the particles while reducing the temperature to 100° C., 10 pbw of the Omicure 94 were added, stirring was continued for 5 min. and the resin was discharged. A film of the filled resin was prepared at a coating weight of 33 g/m$^2$, and combined using a prepreg machine with prepreg tape having a fiber content of 77 wt % and a fiber areal wt. of 161 g/m$^2$, prepared from carbon fiber and EP-2 resin following the procedures of Control Example B. The final prepreg tape had a fiber content of 66.9 wt % and a fiber areal weight of 161 g/m$^2$, with PPO-4 particles dispersed in the resin coating on one surface. Composites were prepared substantially by the procedures of Example 1 to provide test panels having a panel thickness of 0.197 in. The composite composition and property data are summarized in Table I.

The compositions and physical properties of the composites of Examples 1-5, together with those of Control Examples A-C are summarized in the following Table I.

TABLE I

| Ex. No. | Epoxy | Filler (wt %) | Fiber (wt %) | thickness (in.) | CAI (kpsi) |
|---|---|---|---|---|---|
| A | EP-1 | none | 69.5 | 0.186 | 32.6 |
| 1 | EP-1 | PPO-1 7.0 | 71.2 | 0.175 | 49.2 |
| B | EP-2 | none | 63.2 | 0.175 | 28.0 |
| 2 | EP-2 | PPO-3 7.0 | 63.5 | 0.196 | 39.5 |
| C | BMI-1 | none | 66.6 | 0.182 | 12.3 |
| 3 | BMI-1 | PPO-1 7.0 | 67.1 | 0.190 | 16.3 |
| 4 | EP-1 | PPO-2 4.9 | 64.9 | 0.178 | 51.4 |
| 5 | EP-2 | PPO-4 5.6 | 66.9 | 0.197 | 44.6 |

Notes:
EP-1, etc. are Epoxy formulations; these and the abbreviations for filler particles are summarized in text; Filler content is wt. % based on resin content plus filler; Fiber content is wt % based on total composite; CAI = Compression After Impact; see text for testing procedures. For Examples C and 3, the fiber areal weight is 145 g/m$^2$.

It will be apparent from a consideration of the residual compressive strengths of the examples and a comparison with the corresponding control examples that spacing the plies of a layered composite by dispersing polyphenylene ether particles in the matrix resin within the inter-ply spacing affords a substantial improvement in composite toughness. For example, the addition of PPO particles to epoxy matrix resins may increase CAI properties of the composite by as much as 19 kpsi or more, as will be seen by comparing Examples 1 and 4 with A and Examples 2 and 5 with B. The toughening effect of adding polyphenylene particles for other matrix resin systems will also be apparent from the improvement in properties seen in Example 3, compared with C. It will be understood that the degree of improvement in residual compressive strength that will be seen for a particular matrix resin composition may to some extent depend upon the distribution of particle sizes as well as on the level of particles. The level of improvement may also depend in part upon the surface characteristics of the particle and the uniformity with which the particles are dispersed in the matrix resin in the interlayer region.

It is known in the art that adding thermoplastics and resins, and particularly polar materials such as nitrile-containing rubbers, carboxylated olefins, polyamides, polyesters and the like, to the matrix resins of otherwise tough composites may cause an increase in moisture sensitivity. Inability to withstand exposure to moisture can severely restrict the acceptability of toughened composites for many important applications. Several composites produced according to the teachings of this invention were further tested by determining the open hole compression strengths of as-received composite panels and panel specimens that had been boiled in deionized water for three days, to evaluate the ability of the composites to withstand exposure to hot wet environments. The results are summarized in the following Table II.

TABLE II

| Ex. No. | Epoxy | Filler (wt %) | Fiber (wt %) | Open Hole Compr. Str. RT, dry (kpsi) | Open Hole Compr. Str. 220° F., wet (kpsi) |
|---|---|---|---|---|---|
| A | EP-1 | none | 69.5 | 45.5 | 32.1 |
| 1 | EP-1 | PPO-1 7 | 71.2 | 45.8 | 33.7 |
| 4 | EP-1 | PPO-2 4.9 | 64.9 | 49.3 | 32.5 |

Notes.
see notes to Table I; Open Hole Compr(ession) Str(ength), see text.

The open hole compressive strength (OHC) properties of the composites of this invention demonstrate that the presence of polyphenylene ether particles does not significantly detract from either the as-received panel properties or the hot/wet properties of the composites. As will be seen by comparing the data for the 220° F. panels of Examples 1 and 4 having PPO particles with the 32.1 kpsi value for Control Example A without particles, the composite hot/wet properties are not reduced by adding polyphenylene ether particles to the matrix resin, and may be improved in some configurations. As a further comparison, a OHC hot/wet test value determined for composite prepared according to Control Example A but using a cross-linked particulate nitrile rubber as the modifier was 28.6 kpsi, while a similar composite prepared using Torlon 4000TF particles gave a value of 30.6 kpsi.

A variety of additional thermoplastic resins in particle form have also been evaluated. The necessity for substantial insolubility of the resin particle in the matrix resin prior to gelation was demonstrated by dispersing particles of a polyarylether sulfone resin, obtained as Radel R from Amoco Performance Products, Inc. in a cyanate ester/epoxy matrix resin formulation, and particles of a polyether imide, obtained as Ultem 1000 from the General Electric Company, in an epoxy matrix resin formulation. The polyarylether sulfone resin particles dissolved in the cyanate ester/epoxy matrix resin formulation, precipitating during prepreg fabrication to give particles less than 1 micron in size, while the polyether imide particles were completely soluble in the epoxy matrix resin formulation.

Other high temperature resins, though not soluble in the matrix resin, were found to be poorly suited to the toughening of composites because of poor adhesion between the particle and the matrix resin. Particles of crystalline polyaryl ether ketone, obtained as Kadel resin from Amoco Performance Products, Inc., were insoluble in a cyanate ester resin matrix. However, a microscopic examination of the cured filled resin showed that there was little adhesion between the matrix resin and the polyaryl ether ketone particles. A dispersion of mica flake in a cyanate ester matrix resin exhibited a similar lack of adhesion between the matrix resin and the mica particles after cure. Microscopic examination of various cured matrix resin compositions, including both a cyanate ester matrix resin formulation and an epoxy resin formulation, filled with PPO polyphenylene ether particles showed that the cured compositions of this invention exhibit good adhesion between the matrix resin and the particle.

As is disclosed in the art, including in U.S. Pat. No. 4,783,506, a combination of infusible particles made from a rubber polymer with matrix resin formulations based on phase-separated morphologies may be used to toughen composites. However, producing such composites requires careful control in order to be successful. In one process the infusible particles are formed from a solution of a soluble rubber in the epoxy matrix resin during the curing step, while in an alternative process the infusible particle is formed from the soluble rubber in situ as a dispersion in the epoxy resin before fabricating the prepreg. Proper gelation and in situ particle formation during the cure cycle are highly dependent upon resin composition, curing conditions, aging and thermal history of the prepreg and other factors which will necessarily vary with the methods used in the fabrication of parts. In situ formation of the infusible particles in the epoxy resin prior to forming the prepreg also requires a high degree of control, in order to ensure that the rubber does not agglomerate rather than form the particles during the coagulation step, and to avoid inducing premature gelling of the matrix resin during the step of cross-linking the resulting particles. The complexities of producing such materials by in situ production of particles thus favors the use of alternative methods.

In the process of this invention a particle preformed from a rigid, high modulus polyphenylene ether resin is added to a conventional matrix resin formulation prior to curing. The use of such particles provides a substantial improvement in toughness, while allowing the use of conventional process equipment and easily controlled process steps to produce improved toughened composites based on matrix resins having a substantially single phase morphology. The toughened composites of this invention and the methods of their manufacture thus clearly represent an improvement over the composites and processes disclosed in the art.

The invention will thus be seen to be a matrix resin formulation filled with polyphenylene ether resin particles for use in producing toughened fiber-reinforced composite structures, and a method for toughening such composites. The toughened composites comprise discrete layers formed of continuous fiber embedded in a matrix resin, the toughening of the composite being accomplished by including polyphenylene ether resin particles in the matrix resin within the inter-ply spacing of the layered composite. The particles, which may be selected from powdered resins, fiber, flake and mixtures thereof, will be formed of rigid polyphenylene ether resin having sufficient rigidity and hardness to withstand the pressures and temperatures encountered in composite fabrication. The particles will be from 1 to about 75 microns in size, defined as the particle's smallest dimension, and may be a mixture of particles which have been selected to have the majority of particles of a size to provide the desired inter-ply spacing, normally in the range of from 1 to about 75 microns. The method for toughening fiber reinforced composites of this invention may be applied to composites formed using a wide variety of conventional matrix resins in combination with fiber reinforcement. However, the preferred compositions will be based on thermoset matrix resins and more preferably on thermoset resins selected from bismaleimide resin and epoxy resin formulations.

Further modifications and variations will become apparent to those skilled in the resin formulating and composite fabricating art, and such variations and modifications will be included within the scope of the invention as defined by the appended claims.

We claim:

1. A composition comprising from about 20 to about 80 we %, based on final composition, of a continuous fiber reinforcement, and a curable matrix resin formulation comprising a cycloaliphatic epoxy ether resin and from 1 to about 25 wt % of said formulation of polyphenylene ether resin particles having a smallest dimension in the range of from about 1 to about 75 microns.

2. The composition of claim 1 wherein said polyphenylene ether resin particles comprise a polymer of 2,6-dialkylphenol.

3. The composition of claim 1 wherein said polyphenylene ether resin particles comprise a polymer of 2,6-dimethylphenol.

4. The composition of claim 1 wherein said continuous fiber reinforcement is continuous carbon fiber reinforcement.

5. The composition of claim 1 wherein said matrix resin comprises 100 pbw of said cycloaliphatic-epoxy ether, from 6 to about 150 pbw of an amine hardener, and from 0 to about 30 pbw of a thermoplastic polymer dissolved in said epoxy resin.

6. The composition of claim 2, said matrix resin being capable of forming a substantially single, continuous, rigid phase upon curing.

7. The composition of claim 5 wherein said thermoplastic polymer is selected from the group consisting of polyaryl ethers, polyether imides and phenoxy resins.

8. The composition of claim 5 wherein said thermoplastic polymer is a polyaryl sulfone.

9. A composition comprising from about 20 to about 80 wt %, based on final composition, of a continuous carbon fiber reinforcement, and a curable matrix resin formulation comprising: (a) from 99 to about 75 wt % of an epoxy resin formulation comprising 100 pbw of a cycloaliphatic epoxy ether, from about 6 to about 150 pbw of a diamine hardener and from about 0 to about 30 pbw of a thermoplastic polymer soluble in said epoxy resin formulation and selected from the group consisting of polyaryl ethers, polyether imides and phenoxy resins; and (b) from 1 to about 25 wt % particles comprising ak polymer of a 2,6-dialkylphenol, said particles having a smallest dimension in the range of from about 1 to about 75 microns.

10. The composition of claim 9 wherein said particles comprise a polymer of 2,6-dimethylphenol.

11. The composition of claim 9 wherein said thermoplastic polymer is a polyaryl sulfone.

12. The composition of claim 9 wherein said thermoplastic polymer is a polyether imide.

* * * * *